Sept. 19, 1961 B. A. HARRIS 3,001,020

TRUNK CIRCUIT

Filed March 7, 1956 4 Sheets-Sheet 1

INVENTOR.
BEN A. HARRIS
BY Johnson Whitford(?)
ATTORNEY

Sept. 19, 1961 B. A. HARRIS 3,001,020

TRUNK CIRCUIT

Filed March 7, 1956

4 Sheets-Sheet 2

TRUNK CIRCUIT 110

Sept. 19, 1961 B. A. HARRIS 3,001,020

TRUNK CIRCUIT

Filed March 7, 1956 4 Sheets-Sheet 3

TRUNK CIRCUIT 110

Sept. 19, 1961 B. A. HARRIS 3,001,020

TRUNK CIRCUIT

Filed March 7, 1956 4 Sheets-Sheet 4

TRUNK CIRCUIT 110

United States Patent Office 3,001,020
Patented Sept. 19, 1961

3,001,020
TRUNK CIRCUIT

Ben A. Harris, Rochester, N.Y., assignor to General Dynamics Corporation, Rochester, N.Y., a corporation of Delaware Filed Mar. 7, 1956, Ser. No. 570,096
2 Claims. (Cl. 179—7)

This invention relates to telephone systems and more particularly to trunk circuits for use in such systems.

Telephone calls may be divided conveniently into two groups. One group of calls is provided on a free service basis, while the other group of calls is provided on a toll charge basis. In detail, toll calls are those for which special charges are made, depending upon factors such as the length of time consumed by a conversation and the amount of equipment that is necessary to complete a call. In addition thereto, other bits of information may be necessary, not to calculate charges, but to answer customers' questions and complaints about charges which they may believe are unwarranted. For example, customers may want to know the time or day on which an alleged call was made.

Information relating to toll calls may be compiled in several ways. First, toll calls may require the service of an operator who manually records all of the information that is required. Second, toll calls may be directed through switching or other equipment which is provided with recording apparatus that automatically stores information that may be necessary for high grade toll service. Any of several well known forms of recorder apparatus may be used depending upon the nature of the equipment required by the system in which the recorder is used. There are times when these recorders may be out of service. For example, most recorders have a stated capacity which may not be exceeded so that they must be emptied of stored information or refilled with fresh storage media at periodic intervals, or recorders may be out of order or otherwise unavailable. Therefore, it is necessary to provide means for blocking the extension of toll calls at times when there is no recorder available to store required information.

An object of this invention is to provide new and improved trunk circuits.

Another object of this invention is to mark distant ends of trunk lines as busy when recorded toll calls cannot be completed over those trunk lines.

This invention accomplishes these and other objects by providing trunk lines terminated by trunk circuits which are adapted to be seized by toll recorders that are unable at this time to receive and store information. When these trunk circuits are so seized, they return busy markings to all equipment having access to them including equipment at the distant end of an associated trunk line. Assuming that a toll recorder can once more receive and store information, the trunk circuit associated with that recorder is released and its associated trunk line is marked idle at its distant end.

The particular embodiment that is shown in my drawings includes a trunk circuit that is provided with two points of access for extending calls to the trunk circuit and one point of access for extending calls from the trunk circuit. When the recorder associated with this trunk circuit cannot receive and store information, the trunk circuit is seized over the point of access which is used for extending calls from the trunk circuit. Responsive thereto, the trunk circuit is marked as busy at both of its other points of access. In order to mark one of these points of access as busy, it is necessary to mark the distant end of an associated trunk line as busy.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which.

The source of office potential is shown by means of plus (+) and minus (−) signs. As is the case in most telephone systems, the positive terminal is described as being connected to ground; hence, the terms "ground (+)" and "(−) battery" are used hereinafter. It should be understood that either this or any other suitable equipment may be used. Heavily inked rectangle 110 indicates the equipment which is shown in detail in the remaining figures of the drawings.

I have tried to show specific items and to use simple terms where possible to facilitate an understanding of my invention; however, I want it understood that this showing and use is not to act in any manner as a disclaimer of the full range of equivalents which is normally given under established rules of patent law. For example, I have shown a trunk circuit which is provided with a particular type of signaling circuit. It should be understood that any other suitable signaling circuit could be used, such as loop pulsing, for example.

BRIEF DESCRIPTION

Figure 1:
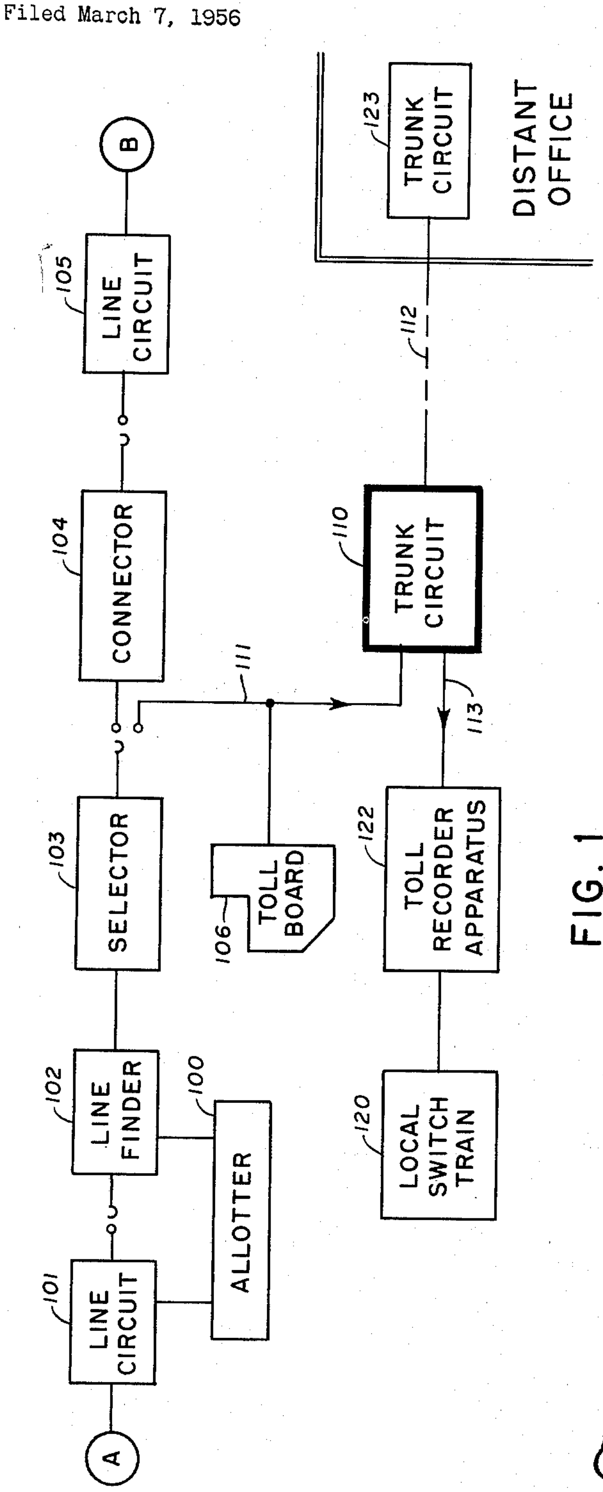
FIG. 1 shows by block diagram a telephone system adapted to use the invention shown in the remaining drawings.
Figure 5:
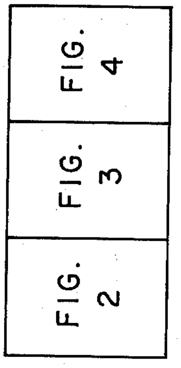
FIG. 5 shows the manner in which the remaining drawings may be joined to provide a complete and understandable circuit.
Figure 2:
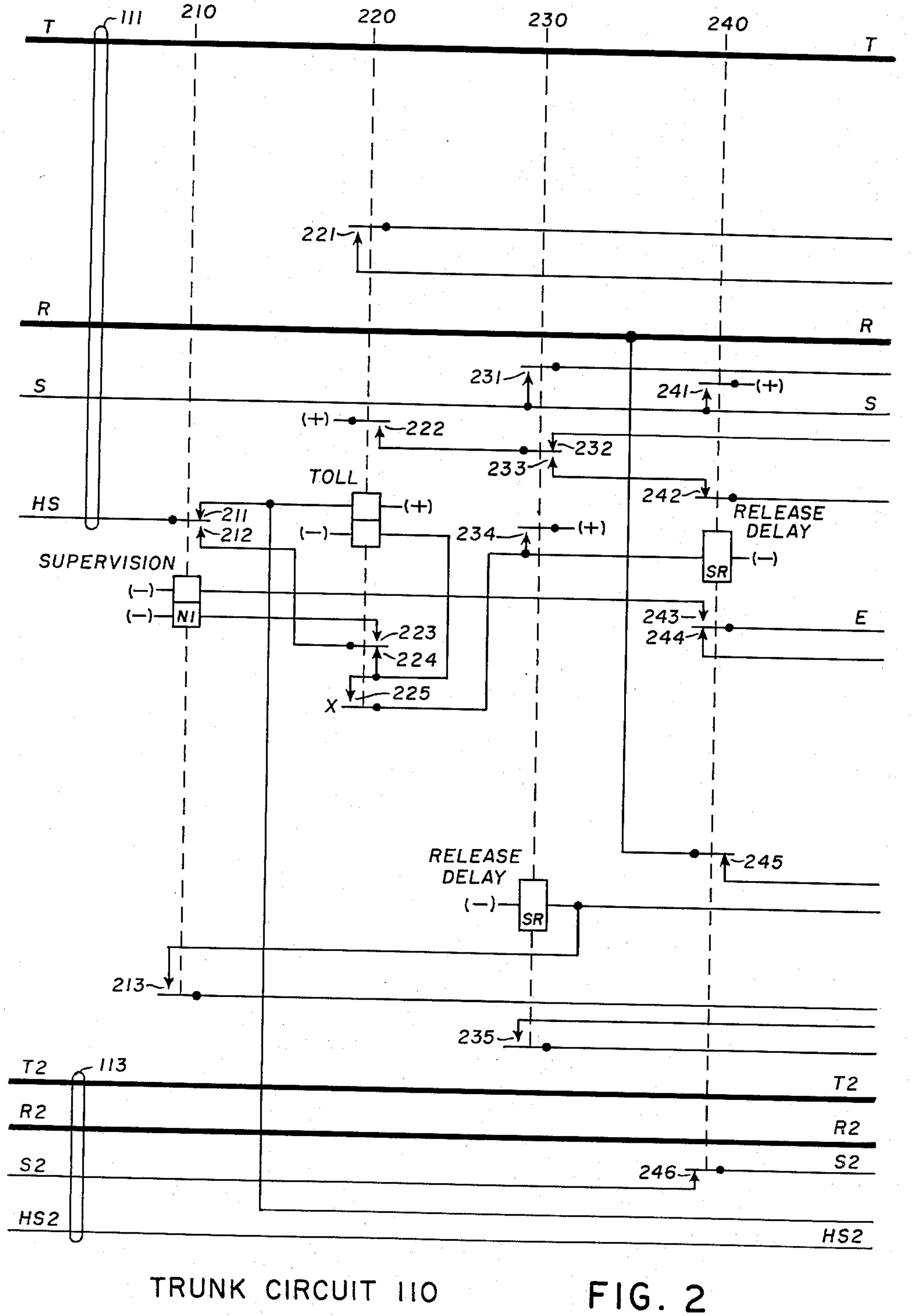
FIGS. 2–4 show details of a trunk circuit.
Figure 3:
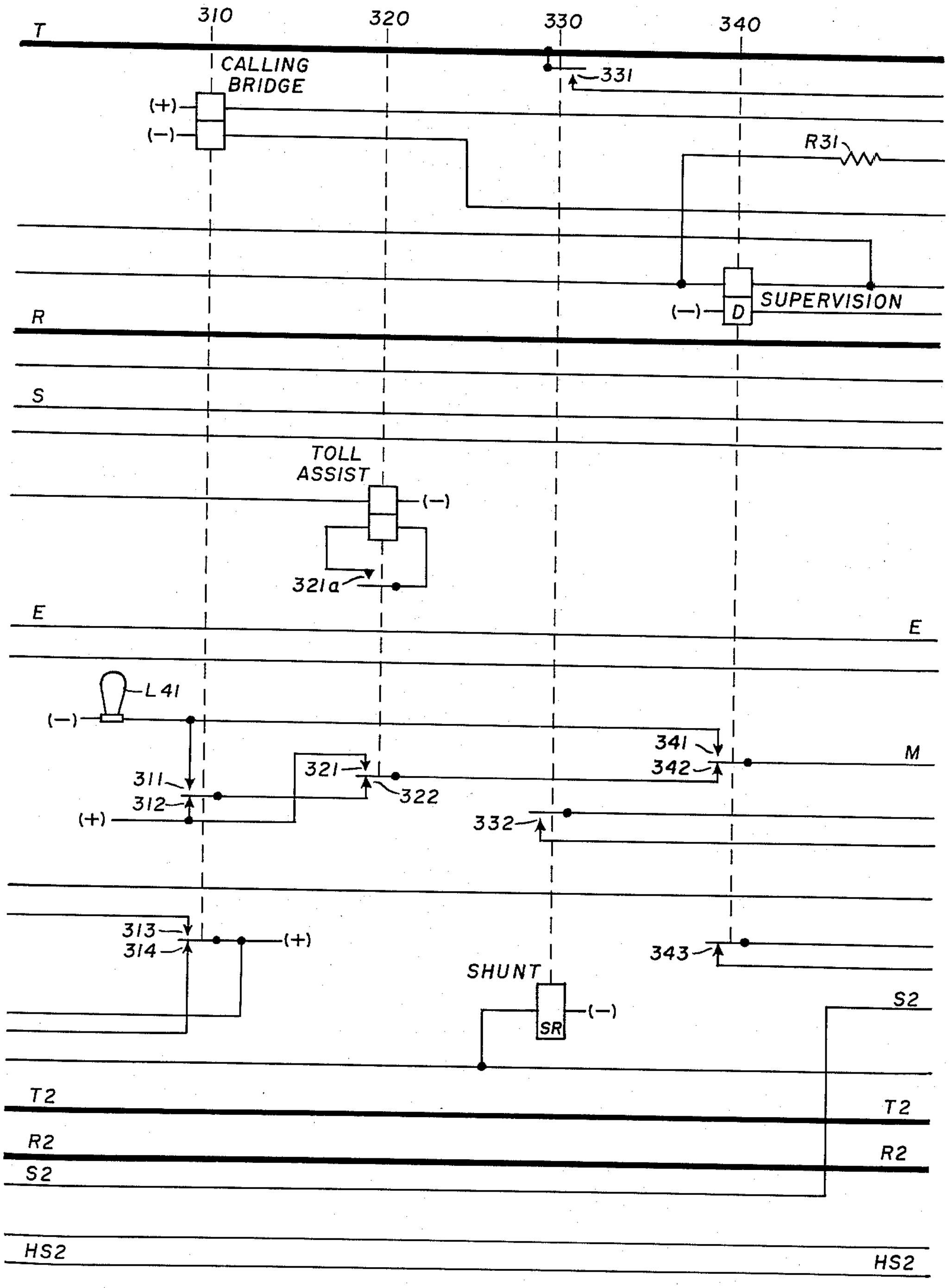
Figure 4:
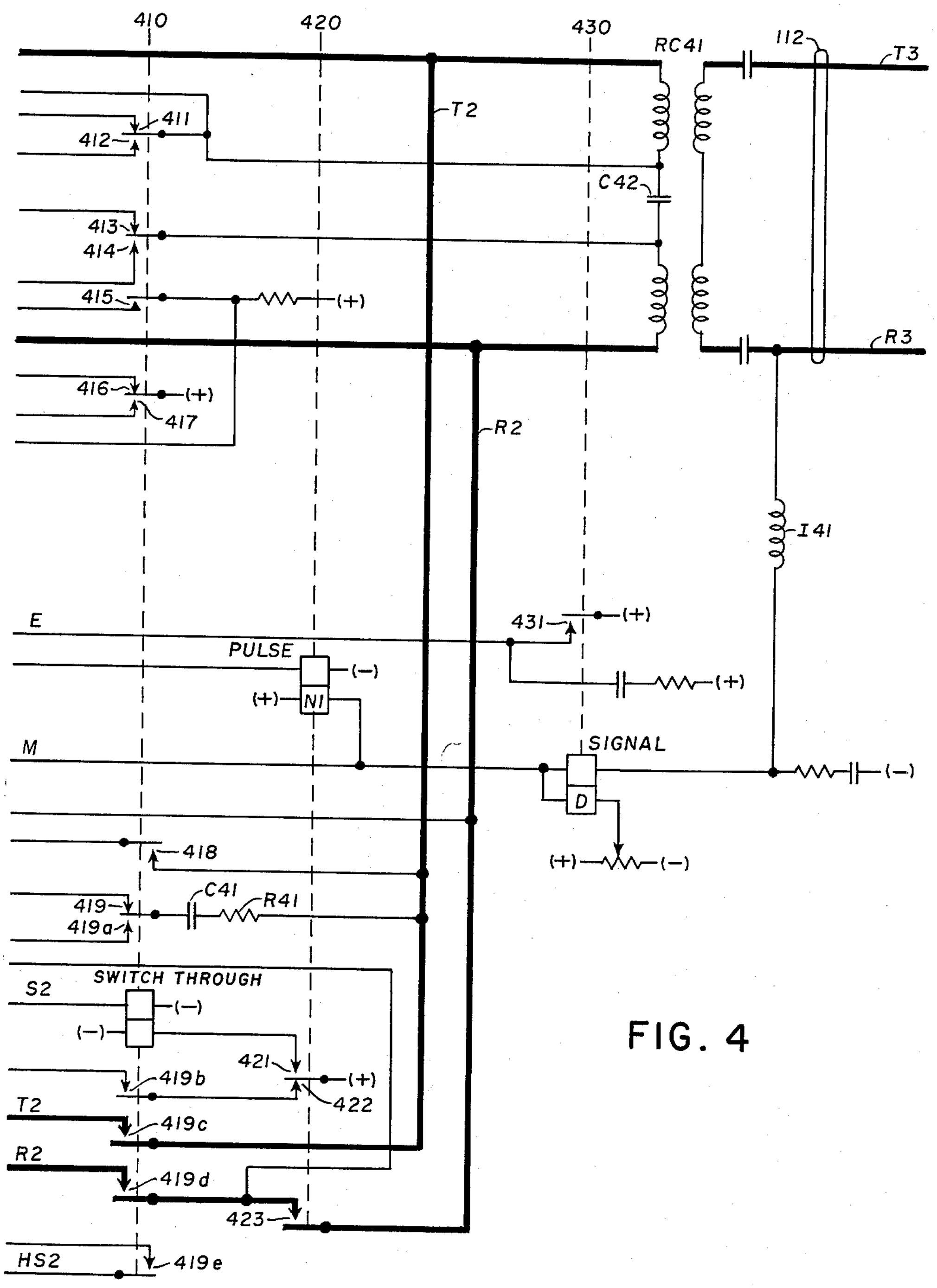

A principal feature of my invention is shown in FIG. 1 by a heavily inked rectangle marked "trunk circuit 110," and by detailed circuit drawings in FIGS. 2–4. The remaining elements in FIG. 1, shown by lightly inked rectangles, are well known to those skilled in the art of automatic telephony. It should be understood that the switching equipment represented by these lightly inked rectangles is shown for reference only, and that any other suitable switching equipment may be used.

Means is provided for completing various types of calls through the system represented by the block diagram shown in FIG. 1. Local calls may be extended over a switch train shown by line circuit 101, line finder 102, selector 103, and connector 104, under the influence of signals transmitted by subscriber A. Outgoing calls to a distant office may be extended either from subscriber line A by way of line circuit 101, line finder 102, selector 103, trunk circuit 110, and trunk line 112; or, from toll board 106 by way of trunk circuit 110 and trunk line 112. It is assumed that all calls from subscriber line A are extended on a free service basis and that no toll information is required. It is also assumed that calls from toll board 106 are extended on a free service basis—or if toll, the operator at toll board 106 records all pertinent information. Incoming calls from a distant office as represented by trunk circuit 123 may be extended over trunk line 112, trunk circuit 110, point of access 113, toll recorder apparatus 122, and local switch train 120. It is assumed that all incoming calls are on a toll basis and that pertinent information relative to these calls is recorded in toll recorder apparatus 122.

On occasions, toll recorder 122 may be unable to receive and store information. For example, it may have exhausted its storage facilities, be out-of-order, be playing back or otherwise disclosing its stored information. Toll recorder apparatus 122 is adapted to seize trunk circuit 110 over point of access 113 when information relative to toll calls cannot be recorded by or stored in apparatus 122. Responsive to this seizure, trunk circuit 110 marks point of access 111 as busy, and causes trunk line 112 to be marked as busy at its distant end. When toll recorder apparatus 122 can receive and store information once again, trunk circuit 110 is released and the busy markings are removed.

It may be noted that toll recorder apparatus 122 has been shown, for purposes of illustration, as connected to record information in the case of calls going through point of access 113. It should be obvious that the toll recorder apparatus may also be associated with the trunk circuit 110 to record information relative to calls that are extended in other directions.

DETAILED DESCRIPTION

One embodiment of my invention is shown in detail in FIGS. 2–4 as an example of a trunk circuit which may be included in the system of FIG. 1 at the point indicated by heavily inked rectangle 110. The various points of access to trunk circuit 110 that are shown in FIG. 1 are also shown in FIGS. 2–4. For example, toll recorder apparatus 122 may be seized over a point of access 113 that is shown in the lower left-hand corner of FIG. 2. Outgoing calls may be extended from selector 103 over point of access 111 that is shown in the upper left-hand corner of FIG. 2. Incoming calls may be extended over trunk line 112 that is shown in the upper-right-hand corner of FIG. 4.

*Outgoing calls*

The first call to be described is one which is assumed to have been extended to the trunk circuit over point of access 111 shown in the upper left-hand portion of FIG. 2, that is, over conductors T, R, S and HS.

When an outgoing call is extended to trunk circuit 110, a loop is completed by any suitable means (not shown) across conductors T and R to prepare trunk circuit 110 for operation. Completion of this loop operates calling bridge relay 310 over the circuit which may be traced from ground (+) through the upper winding of calling bridge relay 310, rest contacts 411, the upper left-hand winding of repeat coil RC41, conductor T, the loop including preceding equipment, conductor R, the lower left-hand winding of repeat coil RC41, rest contacts 413, and the lower winding of calling bridge relay 310 to (—) battery. Responsive to the operation of calling bridge relay 310, contacts 313 close thereby operating release delay relay 230 over an obvious circuit. Also responsive to the operation of calling bridge relay 310, contacts 312 and 311 cooperate to transfer conductor M from ground to battery markings thereby transmitting the seizure signal to the distant office. More particularly, before calling bridge relay 310 operated, signal conductor M was standing with a ground (+) idle marking which could be traced from ground (+) through rest contacts 312, 322, 342, conductor M, the upper winding of signal relay 430, impedance I41 and over conductor R3 to the distant office. The seizure signal is transmitted after calling bridge relay 310 operates contacts 311 to complete a circuit which may be traced from (—) battery through the resistance of lamp L41, operated contacts 311, rest contacts 322, 342, conductor M, the upper winding of signal relay 430, impedance I41 and conductor R3 to the distant office.

Operation of release delay relay 230 extends a busy marking from ground (+) on contacts 416 through contacts 231 and conductor S thereby holding preceding equipment and marking the trunk circuit as busy to other equipment. Contacts 233 close to prepare a circuit for toll assist relay 320; however, this circuit is not completed at this time since contacts 222 are now standing open. Contacts 234 close to operate a second release delay relay 240 that is provided to help carry the contact load which otherwise would have to be carried by relay 230. Contacts 235 close to prepare a circuit for shunt relay 330 which does not operate until receipt of digit pulses. When release delay relay 240 operates, contacts 241 close to apply an alternate ground to sleeve conductor S. Contacts 242 open part of a circuit to toll assist relay 320. Contacts 243 close to connect supervision relay 210 to conductor E, thereby preparing it to receive and respond to signals which may be transmitted from the distant office later during the call. Contacts 245 open to break an idle line termination circuit which may be traced from the lower left-hand winding of repeat coil RC41 to contacts 245, 419, capacitor C41, resistor R41, the upper left-hand winding of repeat coil RC41, capacitor C42, and back to the lower left-hand winding of repeat coil RC41. Contacts 246 open to break sleeve conductor S2 which is used only on calls that are incoming over trunk line 112.

*Toll marking.*—At this point the circuit description digresses to explain how a toll marking might be extended over trunk line 112 if a call had originated at toll board 106 (FIG. 1). That is, on toll calls, conductor HS is marked in any suitable manner by (—) battery thereby causing toll relay 220 to operate over a circuit including contacts 211. When contacts 222 close, a circuit is completed to operate toll relay 320 extending from (—) battery through the upper winding of toll assist relay 320, contacts 242 (during the delay time before release delay relay 240 operates), contacts 233 (after release delay relay 230 operates), and contacts 222 to ground (+). Relay 320 operates and shunts its own lower winding at contacts 321a, thereby making it slow to release. A toll marking is transmitted over trunk line 112 to a distant office when contacts 322 open to remove the (—) battery marking extended through the resistance of lamp L41 to conductor M and when contacts 322 close to apply ground (+) to conductor M.

As explained above, release delay slave relay 240 operates on seizure. After a slow operate time period, relay 240 opens contacts 242 thereby breaking the circuit to toll assist relay 320; however, relay 320 is somewhat slow to release since its shorted lower winding forms, in effect, a copper slug position about the core of the relay. When relay 320 does release, after a brief time period, contacts 321 open and 322 close thereby removing the toll marking to the distant office by switching conductor M from ground (+) to (—) battery. Thus a brief pulse of ground potential marking has been extended over conductor M to signal a toll call to the distant office where any suitable equipment may perform a toll function, if required.

Except as noted in the immediately preceding paragraph, calls from local subscribers and from operator positions are treated in the same manner.

*Dialing.*—Returning to the circuit disclosure as it unfolded before the digression to explain toll marking, it is assumed that trunk circuit 110 is standing ready to receive digit pulses, and that nothing further happens until dial pulses are received over line 111.

Means is provided for receiving and repeating digit pulses. More specifically, calling bridge relay 310 is held operated over the loop circuit including conductors T and R and a suitable sending device, such as the impulse springs of a subscriber's dial, for example. The digit sending device breaks this loop a number of times depending upon the particular digit being dialed. Calling bridge relay 310 restores each time that the loop is broken responsive to an incoming digit pulse. Contacts 313 open a circuit for de-energizing release delay relay 230 during each digit pulse; however, release delay relay 230 has slow-to-release characteristics so that it does not release at this time. Digit pulses are repeated over conductor M each time that relay 310 releases to open contacts 311 and close contacts 312, thereby switching conductor M to ground (+) from (—) battery extended through the resistance of lamp L41. The circuit over which these pulses are repeated by calling bridge relay 310 extends from the distant office over conductor R3, impedance I41, the upper winding of signal relay 430, conductor M, contacts 342, 322 and 311 or 312, as the case may be.

Means is provided to improve pulsing characteristics. More specifically, the first time that calling bridge relay 310 restores to repeat a digit pulse, contacts 314 close to extend ground (+) over a circuit including contacts 235 and the winding of shunt relay 330 to (−) battery, thus causing relay 330 to operate. Contacts 314 open to break this circuit responsive to the end of each digit pulse that follows; however, shunt relay 330 continues to be held operated until the end of the digit pulse train, due to its slow release characteristics. Shunt relay 330 opens its contacts 331 to complete an obvious circuit for short circuiting the upper left-hand winding of repeat coil RC41, thereby improving pulsing characteristics by removing the inductive effect of this repeat coil. Contacts 332 have no function at this time. After the last digit pulse in a pulse train has been received, contacts 314 stand open for a period of time which is longer than the slow release time interval of shunt relay 330 thus causing it to restore and open contacts 331 to remove the shunt around the upper left-hand winding of repeat coil RC41 and to return the talking conductors to their normal condition.

After all digit pulse trains have been repeated to the distant office, the circuit remains in its present condition until answer supervision is received.

*Answer supervision.*—When the called subscriber or operator answers, means (not shown) is provided in the distant office to return answer supervision in the form of a (−) battery marking which is connected to conductor R3 and extended over the circuit including impedance I41, the upper winding of signal relay 430, conductor M, resting contacts 342, 322, 311, and the resistance of lamp L41 to (−) battery. When its upper winding is connected in this manner, differential signal relay 430 is arranged to release thereby repeating answer supervision through trunk circuit 110. Specifically, contacts 431 close to connect ground (+) over conductor E, contacts 243, and the upper winding of supervision relay 210, thus causing it to operate.

At this point the circuit description once again digresses to explain what would happen if the call were extended from an operator's position, such as toll board 106 (FIG. 1). On toll calls, conductor HS is marked by (−) battery so that toll relay 220 operates. Therefore, when relay 210 operates responsive to answer supervision, contacts 211 open and 212 close thus transferring conductor HS from the marking of ground (+) extended through the resistance of the upper winding of toll relay 220 to the marking of (−) battery extended over the circuit that may be traced through the non-inductive resistance of the lower winding of supervision relay 210, contacts 223 and 212. Any suitable preceding equipment (not shown) may use this transfer of marking potential applied to conductor HS for performing any desired function such as the initiation of conversation timing, call metering, or the like.

Returning to the operation of supervision relay 210, contacts 213 close to prepare a circuit to hold release delay relay 230 after calling bridge relay 310 releases at the end of the conversation.

Conversation follows and nothing further happens until the call is terminated.

*Release.*—The function which follows depends upon which end releases first. To illustrate, let it be assumed that the calling end is the first to release, in which case the loop across conductors T and R is broken by any suitable means (not shown) thereby releasing calling bridge relay 310. Responsive thereto, contacts 311 open while contacts 312 close thereby returning disconnect supervision to the distant office in the form of a ground (+) marking, which is extended over contacts 312, 322, 342, conductor M, the upper winding of signal relay 430, impedance I41 and conductor R3. Signal relay 430 is arranged to operate when energized in this manner thereby closing contacts 431. Supervision relay 210 is operated over the circuit including conductor E and contacts 243.

Returning to the release of calling bridge relay 310, contacts 313 open; however, release delay relay 230 does not restore at this time since it continues to hold operated over a circuit including contacts 213. Nothing further happens until the operator at the distant end disconnects.

Means (not shown) is provided in the distant office to extend a signal when the operator disconnects. This disconnect signal may take the form of a ground (+) marking which is extended over conductor R3, impedance I41, the upper winding of signal relay 430, conductor M, contacts 342, 322 and 312 to ground (+). Signal relay 430 is arranged to release when energized in this manner, thus opening contacts 431 to restore supervision relay 210. Next, contacts 213 open to restore release delay relay 230.

Responsive to the release of relay 230, contacts 231 open to remove one alternate ground (+) marking from sleeve conductor S. Contacts 234 open to restore release delay slave relay 240.

Responsive to the restoration of relay 240, contacts 241 open thereby removing the remaining ground (+) marking from sleeve conductor S. Contacts 243 open and 244 close thereby returning conductor E to its normal connection with pulse relay 420. Contacts 245 reconnect idle line termination including capacitor C41 and resistor R41 to talking conductors T and R.

The circuit is completely restored at this time and is ready for the next call.

*Incoming call*

It is assumed that the next call to be described is extended to trunk circuit 110 via trunk line 112.

Means (not shown) is provided in a distant office for seizing trunk circuit 110 by extending a (−) battery marking over conductor R3, impedance I41, the upper winding of relay 430, conductor M, contacts 342, 322 and 312 to ground (+). Differential signal relay 430 is arranged to operate when energized in this manner. Responsive to the operation of signal relay 430, contacts 431 close to complete a circuit which extends from ground (+) through contacts 244 and the upper winding of pulse relay 420 (−) battery, thus causing it to operate.

The function of pulse relay 420 at this time is to initiate operation of trunk circuit 110 and later during a call to receive and repeat digit pulses which may be transmitted from a distant office. Contacts 423 close to prepare a pulsing path for controlling the operation of switch trains in the local office. Responsive to the operation of relay 420, contacts 421 close to operate switchthrough relay 410 over an obvious circuit.

When switchthrough relay 410 operates, contacts 419*e* close to complete a circuit which is explained later in the section entitled "Toll recorder holding." Contacts 419*b* close to prepare a circuit for shunt relay 330 which is completed later when digit pulses are received. Contacts 419*a* close to switch idle line termination to act as spark protection for pulsing contacts 423 over the circuit that may be traced from conductor T2 through resistor R41, capacitor C41, operated contacts 419*a*, rest contacts 343 and 423 to conductor R2. Formerly, idle line termination was completed, before relay 410 operated, over a circuit that may be traced from repeat coil RC41, to resistor R41, capacitor C41, contacts 419 (now open), contacts 245 and back to repeat coil RC41. Also responsive to the operation of switchthrough relay 410, contacts 417 close to mark sleeve conductor S as busy and contacts 418 close to prepare part of a pulsing circuit. Contacts 415 close to energize the lower winding of supervision relay 340 over an obvious circuit. The upper winding of supervision relay 340 is included in a loop circuit extending over the talking conductors to seize and control local switching means. The loop circuit may be traced from conductor T2 through operated contacts 419*c*, the upper left-hand winding of repeat coil RC41, operated contacts 412, resistor R31, the upper winding of supervision relay 340, contacts 414, the lower left-hand winding of repeat coil RC41, operated contacts 423, operated contacts 419*d* and conductor R2. Supervision relay 340 is differentially energized at this time so that it may be controlled by the direction of current flow in the loop circuit, as by reverse battery during answer supervision, for example. That is, the flux produced responsive to the normal direction of current flow through the upper winding of supervision relay 340 opposes the flux produced in the lower winding of relay 340 so that it does not operate at this time.

The circuit is now ready to receive digit pulses and nothing further happens until they are received.

*Dialing.*—Means is provided in a distant office for transmitting digit pulses over conductor R3. Normally, conductor R3 is marked by (−) battery potential at this stage during the extension of a call. Conductor R3 is switched from this (−) battery marking to a ground (+) marking responsive to each digit pulse transmitted from the distant office and is switched from ground (+) to a (−) battery marking at the end of each digit pulse. Signal relay 430 is arranged so that it is released and reoperated each time that conductor R3 is so switched by the digit pulses. Responsive thereto, contacts 431 open and close to release and reoperate pulse relay 420 over the circuit extending from (−) battery through the upper winding of relay 420, contacts 244, conductor E, and contacts 431 to ground (+). Responsive to each digit pulse received over conductor R3, contacts 423 are pulsed by relay 420, thus breaking a loop extended to local switching equipment. The first time that pulse relay 420 releases in each digit pulse train, contacts 422 close for operating shunt relay 330 over the circuit that can be traced from (−) battery through the winding of shunt relay 330, contacts 419*b* and 422 to ground (+). Responsive thereto, contacts 332 close to shunt repeat coil RC41. The pulsing loop now extends from tip conductor T2, through contacts 419*c*, contacts 418, contacts 332, contacts 423, contacts 419*d* and ring conductor R2. Each time that pulse relay 420 reoperates after a digit pulse has been transmitted, contacts 422 open; however, shunt relay 330 does not restore until the end of the digit pulse train due to its slow-to-release characteristic. After the last digit pulse in a pulse train has been completed, contacts 422 remain open for a period of time which is long enough for shunt relay 330 to restore and open contacts 332 thus breaking the shunt across repeat coil RC41.

Any suitable means in the local office may return a ground (+) marking over conductor S2, contacts 246, and the upper winding of relay 410 to (−) battery thereby completing a holding circuit for relay 410 which is effective at the end of the call. While this feature may have many applications, it is explained in greater detail hereinafter in connection with the section entitled "Toll recorder holding."

Means is provided in the local office for utilizing the digit pulses repeated at contacts 423 to direct switching equipment to seize and signal a called subscriber. Nothing further happens until the called subscriber answers.

*Answer supervision.*—When the called subscriber answers, any suitable means may function to return answer supervision in the form of reverse battery; or, stated otherwise, the direction of current flow over conductors T2 and R2 is reversed. Responsive thereto, the direction of flux produced in the upper winding of supervision relay 340 is reversed so that the fluxes produced by both windings are aiding and relay 340 operates. The circuit for operating relay 340 may be traced from conductor T2 over contacts 419*c*, repeat coil RC41, contacts 412, resistor R31, the upper winding of supervision relay 340, contacts 414, the lower winding of repeat coil RC41, contacts 423, 419*d*, and conductor R2. When supervision relay 340 operates, contacts 341 close and contacts 342 open thereby switching conductor M from its normal ground (+) marking to a (−) battery marking which is extended through the resistance of lamp L41, contacts 311, contacts 322, 342, conductor M, the upper winding of signal relay 430, impedance I41, and conductor R3 to the distant office where any suitable equipment may respond. Also responsive to the operation of supervision relay 340, contacts 343 open to break the spark protection circuit including capacitor C41 and resistor R41.

At this point it may be well to digress for a moment to explain an alternate method of returning answer supervision. That is, some equipment may return answer supervision in the form of a (−) battery marking applied to conductor HS2. If so, toll relay 220 is operated over a circuit completed from conductor HS2 via contacts 419*e*, and the upper winding of toll relay 220 to ground (+). Responsive thereto, contacts 222 close to operate supervision relay 340 over the circuit extending from ground (+) through contacts 222, 232, 415, and the lower winding of relay 340 to (−) battery. Supervision relay 340 operates and the circuit functions in the manner explained above.

Returning to the circuit description, conversation may follow and nothing further happens until the call is completed at which time the conductor R3 is switched from (−) battery to ground (+). Responsive thereto, signal relay 430 releases and contacts 431 open to restore pulse relay 420. When pulse relay 420 restores, contacts 421 open to de-energize the lower winding of switchthrough relay 410.

The next circuit function depends upon whether certain toll recorder apparatus has completed its function or not. If not, trunk circuit 110 is held operated over conductors S2 and HS2 is the manner explained below in the section entitled "Toll recorder holding." On the other hand, if the toll recorder has completed its function, ground (+) is removed from conductor S2 so that switchthrough relay 410 is released and trunk circuit 110 is returned to normal.

*Toll recorder holding.*—Returning to a description of FIG. 1, calls which may be extended through trunk circuit 110 over the point of access designated 113 require the services of toll recorder apparatus 122. Any suitable toll recorder apparatus may be used for this purpose; however, there are times when it is necessary to take the toll recorder apparatus 122 out of service and to block the completion of calls through trunk circuit 110 until recorder apparatus 122 is returned to service. At other times it may be necessary to block the completion of calls through trunk circuit 110 until toll recorder apparatus 122 has completed its function relating to the storage of all desired information relative to a call which has just been completed.

Means is provided in the toll recorder apparatus for seizing and holding trunk circuit 110 until calls may be completed through it. Referring to the detailed drawings of trunk circuit 110, as shown in FIGS. 2–4, the toll recorder apparatus applies a ground (+) marking to conductor S2 and a (−) battery marking to conductor HS2 when it is necessary to hold trunk circuit 110. Responsive thereto, a circuit is completed from ground (+) on conductor S2 through contacts 246 and the upper winding of switchthrough relay 410 to (−) battery, thus holding relay 410 operated or causing it to operate as the case may be. Contacts 417 close to apply a ground (+) potential to conductor S thereby marking trunk circuit 110 as busy to local switching equipment and blocking calls through the point of access designated 111. When contacts 419*e* close, (−) battery potential is extended from conductor HS2 to the upper winding of toll relay 220 and ground (+). Responsive to the operation of toll relay 220, contacts 222 close thereby extending ground (+) over a circuit including contacts 232, 415, the lower winding of supervision relay 340 to (−) battery. Supervision relay 340 operates because the upper winding is not energized at this time so that relay 340 is not differentially energized. Contacts 341 close and contacts 342 open thereby extending a circuit for switching conductor M from ground (+) to (−) battery extended over the circuit from (−) battery through the resistance of lamp L41, contacts 341, conductor M, the upper winding of signal relay 430, impedance I41 and conductor R3 to the distant office. Any suitable means in the distant office responds to this (−) battery marking and applies a busy marking to prevent the extension of calls to trunk circuit 110 over trunk line 112.

When the toll recorder apparatus is ready to receive and store further information, the markings are removed from conductors S2 and HS2. When ground (+) is removed from conductor S2, switchthrough relay 410 restores thereby opening contacts 417 to remove the battery marking from conductor S to make trunk circuit 110 once again idle to calls which may be extended through the point of access designated 111. When the (−) battery marking is removed from conductor HS2, toll relay 220 restores thereby opening contacts 222 for releasing supervision relay 340. When supervision relay 340 releases, contacts 342 close and 341 open thereby switching conductor M from the (−) battery marking extended through the resistance of lamp L41 to a ground (+) marking. A circuit may now be traced from ground (+) through contacts 312, 322, 342, conductor M, the upper winding of signal relay 430, impedance I41 and conductor R3. Any suitable equipment at the distant office may respond to this marking and remove the busy marking that had been preventing calls from being extended over the trunk line 112.

The trunk circuit 110 is now in a released condition and prepared to receive the next call.

While I have shown and described a specific embodiment of my invention, other modifications will readily appear to those skilled in the art. I do not, therefore, desire my invention to be limited to the specific arrangement shown and described, and I intend in the appended claims to cover all modifications that fall within the true spirit and scope of my invention.

What is claimed is:

1. In a telephone system, a first office, a second office, a trunk line extending between said offices, a trunk circuit at said first office coupled to one end of said trunk line, a toll recorder at said first office for recording information relating to calls forwarded by said trunk circuit, said trunk circuit having an output circuit coupled to said toll recorder for forwarding calls received from said second office and means for preventing seizure of said trunk circuit by equipment at said second office over said trunk line as long as said toll recorder is unable to receive information relating to calls forwarded by said trunk circuit.

2. In a telephone system, a first office, a second office, a trunk line extending between said offices, a trunk circuit at said first office coupled to one end of said trunk line, a toll recorder at said first office for recording information relating to calls forwarded by said trunk circuit, said trunk circuit having an input circuit for forwarding calls over said trunk line to said second office and an output circuit coupled to said toll recorder apparatus for forwarding calls received from said second office and means for preventing seizure of said trunk circuit by equipment at said first office over said input circuit or by equipment at said second office over said trunk line as long as said toll recorder is unable to receive information relating to calls forwarded by said trunk circuit.

References Cited in the file of this patent

UNITED STATES PATENTS

| | | |
|---|---|---|
| 2,782,257 | Blashfield et al. | Feb. 19, 1957 |
| 2,843,672 | Gatzert | July 15, 1958 |
| 2,886,642 | Morris et al. | May 12, 1959 |